United States Patent [19]

Beasley et al.

[11] Patent Number: 4,852,901

[45] Date of Patent: Aug. 1, 1989

[54] TRAILER HITCH POSITIONING APPARATUS

[76] Inventors: Donald R. Beasley, 2140 S. Pacific Hwy., Kelso, Wash. 98626; Paul J. Hanson, 2914 Westside Hwy., Castle Rock, Wash. 98611

[21] Appl. No.: 17,262

[22] Filed: Feb. 20, 1987

[51] Int. Cl.[4] ............................................. B62Q 1/00
[52] U.S. Cl. ..................................... 280/477; 33/264
[58] Field of Search ............ 280/477; 340/52 R, 686; 33/264, 286

[56] References Cited

U.S. PATENT DOCUMENTS

| | | |
|---|---|---|
| 2,214,161 | 9/1940 | Cater . |
| 2,955,778 | 10/1960 | Beveridge . |
| 2,984,011 | 5/1961 | Hamilton . |
| 3,046,549 | 7/1962 | Kalmus . |
| 3,121,228 | 2/1964 | Kalmus . |
| 3,418,628 | 12/1968 | Fenner . |
| 3,605,088 | 7/1971 | Sovelli ................................. 340/686 |
| 3,771,325 | 11/1973 | Sweeney et al. . |
| 3,790,276 | 2/1974 | Cook et al. ........................... 356/152 |
| 3,825,921 | 7/1974 | Marus et al. . |
| 3,924,257 | 12/1975 | Roberts . |
| 3,947,839 | 3/1976 | Zigmant . |
| 4,199,756 | 4/1980 | Dito . |
| 4,552,376 | 11/1985 | Cofer ................................... 280/477 |

Primary Examiner—Charles A. Marmor
Assistant Examiner—Donn McGiehan
Attorney, Agent, or Firm—Klarquist, Sparkman, Campbell et al.

[57] ABSTRACT

A trailer hitch positioning apparatus directs the driver of a pickup truck or other towing vehicle during backing up to a trailer or other towed vehicle for hitching the coupling elements of the vehicles together. The apparatus includes an infrared light unit mounted on the trailer for transmitting a first collimated light beam of a predetermined horizontal width toward the vehicle. A support bar mounted to the rear of the vehicle carries a plurality of infrared alignment sensors for detecting the first beam and hence when the truck is aligned with the trailer. A position emitter mounted on the trailer emits a second focused infrared light beam that is detected by a position sensor on the truck when the coupling elements of the vehicles are in position to be hitched together. An indicator coupled to the alignment sensors and to the position sensor indicates the direction of turning the steering wheel in the event of misalignment of the vehicles and also indicates when the vehicles are positioned to be hitched together.

4 Claims, 3 Drawing Sheets

TRAILER HITCH POSITIONING APPARATUS

BACKGROUND OF THE INVENTION

This invention relates generally to a guiding or positioning apparatus for use during hitching a pickup truck or other towing vehicle to a trailer or other towed vehicle. More particularly, this invention relates to a positioning apparatus for aligning the coupling elements of the two vehicles as the towing vehicle is backed up or driven toward the towed vehicle and for indicating when the coupling elements are positioned to be coupled.

Hitching a vehicle to a trailer can be a long and frustrating process, especially when attempted by a single person. Because the coupling elements (i.e., ball and hitch) on the vehicle and trailer are normally not visible from the driver's seat, the driver must periodically stop the vehicle and inspect the alignment and position of the ball and hitch before moving the vehicle closer to the trailer. Even with frequent visual inspections, some misalignment of the ball and hitch normally result. A driver must then repeat the process or, if possible, manually shift the tongue and thus the hitch of the trailer over the ball so that the two vehicles can be hooked up. Complicating the maneuvering is the fact that a driver can become easily confused as to which direction to turn the front wheels in order to back the vehicle in the desired direction.

In an attempt to improve on this manual method, prior guidance systems have been designed for assisting a driver in maneuvering a vehicle toward a trailer. U.S. Pat. No. 3,924,257 to Roberts, for example, discloses a trailer hitch guide that uses a transmitting coil on a trailer and orthogonally arranged receiving coils on the back of a vehicle. The transmitting coil produces a hemispherical magnetic field that can be detected by the receiving coils on the vehicle. This patent recites that, depending on the orientation of the receiving coils to the field, the alignment and position of the vehicle relative to the trailer can be determined from a direction indicator visible to the driver. The Roberts device, however, is understood to have a number of drawbacks. For example, magnetic field decreases in strength dramatically with distance, limiting the effective range of a device such as Roberts. Also, it is believed that the Roberts device may not always accurately indicate the relative position of the hitch and ball due to limitations of the Roberts approach.

Other exemplary prior devices for guiding the backing of a vehicle to a trailer are disclosed in U.S. Pat. No. 4,199,756 to Dito, U.S. Pat. No. 2,984,011 to Hamilton, and U.S. Pat. No. 3,418,628 to Fenner. These devices rely on mechanical contact switches or visual alignment mechanisms that are cumbersome and/or which must be mounted temporarily to a vehicle and trailer for use when attempting to back up and hitch the two together.

SUMMARY OF THE INVENTION

An object of the invention, therefore, is to provide an improved guiding apparatus for use in aligning and positioning a coupling element of a towing vehicle in hitching relation to a coupling element of a trailer or other towed vehicle.

A further object of the present invention is to provide a compact, easily installed, durable and reliable guiding apparatus as well as such an apparatus which is relatively inexpensive and easy to manufacture.

Yet another object of the invention is t provide such an apparatus with a visual indicator that indicates when the coupling elements of the vehicles are aligned and when their respective coupling elements are in position for coupling together.

Another object of the invention is to provide such an apparatus that indicates to the driver the direction in which to turn the steering wheel of the towing vehicle so as to align it with the towed vehicle.

Still another object of the invention is to provide such an apparatus which utilizes focused optical beams for indicating alignment and positioning of the towing vehicle relative to the towed vehicle.

A further object of the invention is to provide an apparatus capable of detecting certain objects and people between the towed and towing vehicle thereby reducing the risk of accidents during use and enhancing the overall safety during use of the apparatus.

To achieve these objects, an apparatus in accordance with the present invention comprises an emitting means mounted on a trailer or other towed vehicle for transmitting a first focused optical beam toward a truck or other towing vehicle. A sensing first means for receiving the first beam is mounted on the truck and comprises a plurality of sensors in predetermined relation to a towing coupling element, such as a ball coupler, mounted to the truck. These sensors discretely detect the presence of the first beam relative to the towing coupling element. The emitting means may also include means for emitting a second focused optical beam. A second sensing means or position sensor on the truck is positioned to detect the second focused beam when the ball coupler is in hitching relation to a towing coupling element, such as a trailer hitch on the tongue of the trailer. An indicator is electrically coupled to both the first and second sensing means. The indicator comprises means for indicating alignment and misalignment of the truck ball and trailer hitch as the truck is backed up and also for indicating the direction in which the truck steering wheel should be turned to align these coupling elements in the event of any misalignment. In addition, the indicator comprises means for indicating when the coupling elements are in hitching relation.

In accordance with one specific aspect of the invention, the first sensing or receiver means comprises at least two sensors spaced apart laterally along the rear of the towing vehicle on either side of the ball coupler. In the illustrated embodiment, these two sensors are spaced equidistantly from the center of the ball coupler and along a line normal to the longitudinal vehicle axis. Also, the first optical beam is of a predetermined horizontal width and is centered about a vertical plane through the center of the hitch and containing the longitudinal axis of the towed vehicle. In addition, the two sensors are spaced apart a distance slightly greater than the width of the first focused beam. Therefore, the hitch and ball are aligned when the beam is between the sensors. The first receiver means may also include a third sensor spaced between the two sensors for detecting the presence of the first beam therebetween.

In the illustrated embodiment, and as a more specific aspect of the present invention, the emitting means comprises an infrared light emitter for projecting infrared light through a collimating lens and a separate position emitter for emitting a second focused infrared light beam. The first and second receiver means each comprise infrared light sensors tuned to the frequency of infrared light emitted by the emitting means.

The foregoing and other objects, features, and advantages of the present invention will become more apparent from the following detailed description of a preferred embodiment which proceeds with reference to the accompanying drawings.

DETAILED DESCRIPTION

Figure 1:
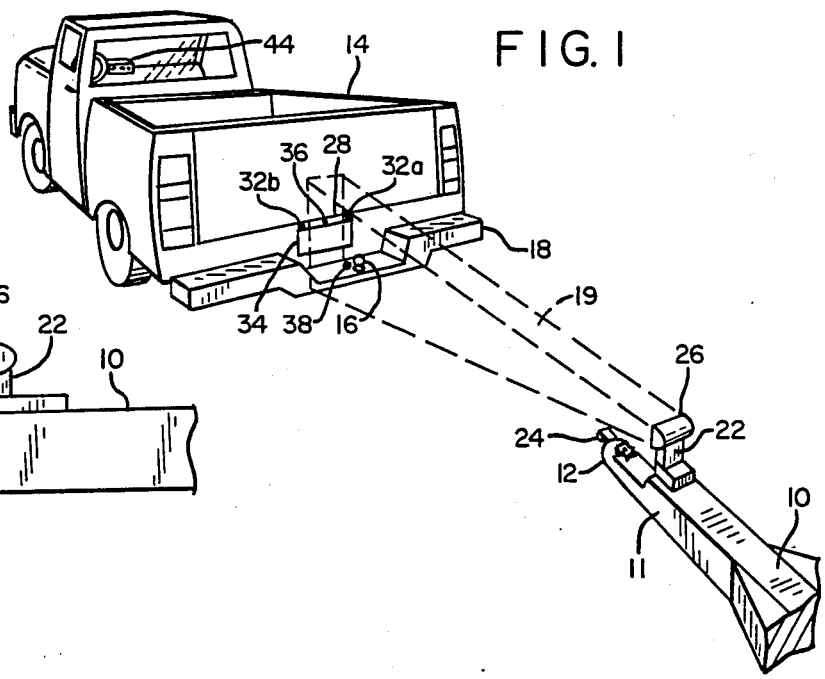
FIG. 1 is a perspective view of a trailer hitch positioning apparatus according to the invention with the towing and towed vehicles shown properly aligned.
Figure 2:
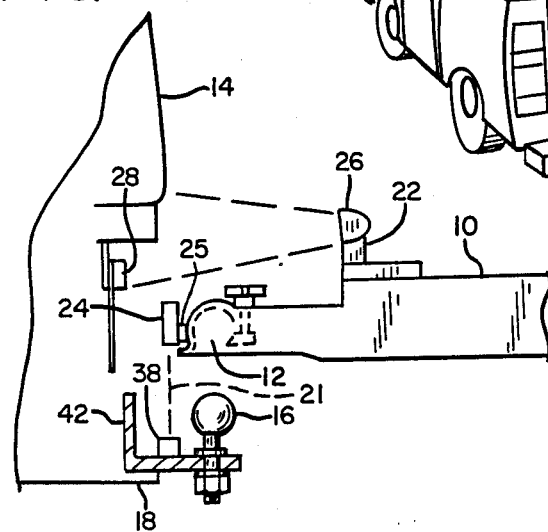
FIG. 2 is a side view of the apparatus of FIG. 1 showing the vehicles in position to be hitched together.

With reference to FIGS. 1 and 2 of the drawings, a portion of a trailer 10 or other towed vehicle is shown having an elongated tongue 11 which terminates in a towed coupling element such as a hitch 12. A truck 14 or other towing vehicle is also shown with a towing coupling element such as a matching ball coupler 16 mounted on the rear bumper 18. The ball coupler 16 and hitch 12 exemplify one type of conventional mechanism for coupling the trailer 10 and truck 14 together.

An emitting means is mounted on the tongue 11 of the trailer 10 for transmitting a first focused optical beam 19 forwardly from the trailer and toward the truck. This means also comprises means for projecting a second focused beam 21 downwardly from a location forwardly of hitch 12. In the illustrated embodiment, the emitting means comprises an infrared light transmitting unit 22 mounted, as by a magnet or fastener (not shown) to the tongue 11, for projecting the first focused beam and an infrared position emitter 24 similarly mounted by a magnet or other fastener 25 to tongue 11 for projecting the second focused beam, both powered by a battery within the housing of transmitter unit 22. As can be seen in FIG. 1, the first beam is of a rectangular cross section and has a predetermined horizontal width that remains substantially constant as the beam projects and an expanding vertical height. The light unit 22 produces this beam by projecting infrared light from plural emitters (described below) through a commercially available half-cylindrical collimating lens (not shown) of approximately the desired beam width and which is positioned within emitter housing 26. The light unit 22 is situated such that the first collimated beam is centered in a vertical plane containing the longitudinal trailer axis and bisecting the hitch 12. As best seen in FIG. 2, the emitter 24 is mounted to hitch 12 for transmitting the second focused beam 21 downwardly beyond the front end of the hitch and centered in this same vertical plane.

Figure 6:
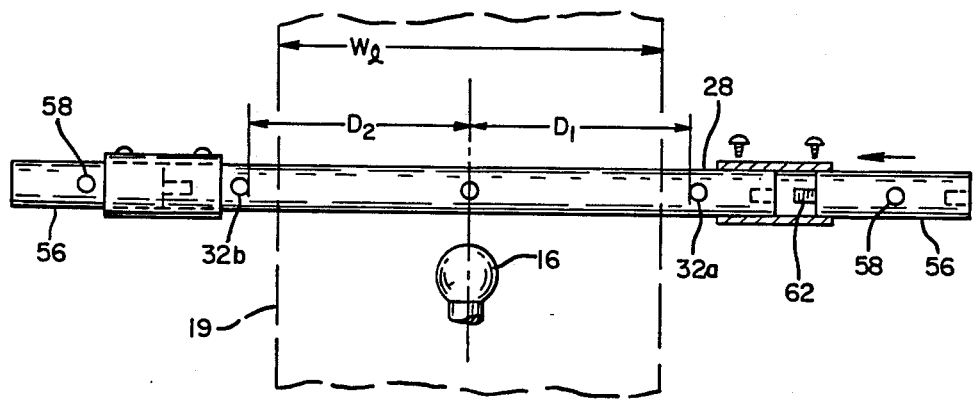
FIG. 6 is a front elevational view, partially in section, of one form of sensor or detector mechanism used in the apparatus of FIG. 1.

A means for receiving the collimated beam from light unit 22 is mounted to the rear of the truck 14 and includes a support bar 28 which carries at least two infrared alignment sensors 32a, 32b spaced apart laterally thereon and positioned on either side of the ball coupler 16. The support bar 28 is mounted to the rear of the truck 10, preferably to the rear license plate bracket 34, so as to be perpendicular to the longitudinal axis of the vehicle 14. The alignment sensors 32a, 32b are typically laterally spaced equidistantly from the center of the ball coupler 16. More specifically, and for reasons explained more fully below, the sensors 32a, 32b are spaced apart a distance equal to or more preferably slightly greater than the width of the collimated beam. This is best seen in FIG. 6 wherein the width of the beam 19 is indicated as $W_1$ and the distance between the two sensors 32a and 32b is indicated by the sum of the equal distances $D_1$ and $D_2$ from the respective sensors 32a and 32b to the center of the ball coupler 16. In the present embodiment, the distance between sensors 32a, 32b is eight inches, with the predetermined width of the beam being about seven and one-half to seven and three-fourths inches up to about 30 feet. The bar 28 also typically includes a third alignment sensor 36, spaced between the two sensors 32a, 32b, for detecting the presence of the collimated beam 19 between the two sensors. The sensor 36 may be positioned in alignment with the towing vehicle axis and thus the center of ball coupler 16. Also, sensors 32a, 32b and 36 are typically coated with a purple transparent film to provide better filtering of undesired fluorescent light from the environment. The use of infrared signals minimizes interference from ambient light sources and also results in a highly accurate apparatus.

Means are also provided for detecting the second focused beam projected by positioning emitter 24 when the hitch 12 is over the ball coupler 16 in hitching relationship thereto, as shown in FIG. 2. The means may comprise a position sensor 38 mounted, as by a magnet or fastener, to a hitch bracket 42 that supports the ball coupler 16. The sensor 38 is aligned with the center of ball coupler 16. The sensor 38 receives light from position emitter 24 when the hitch 12 is immediately above the ball coupler 16. Position emitter 24 and position sensor 38 may be at any other convenient location on the respective trailer and truck as long as the hitch is over the ball when the position sensor receives the desired light signal from the position emitter.

Figure 3:
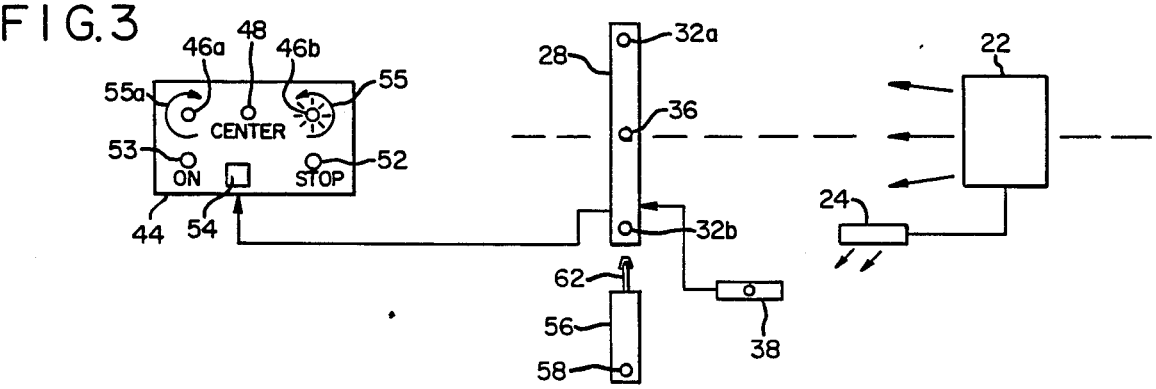
FIG. 3 is an overall block diagram view of the apparatus of the invention.

The outputs of the alignment sensors 32a, 32b and 36 and the position sensor 38 are coupled via circuits, described below, to an indicator 44 mounted on the dash of truck 14 or at any other location easily viewed by the driver. As best shown in FIG. 3, indicator 44 has a top row of indicator lights 46a, 46b and 48 coupled to the sensors 32a, 32b and 36 on the support bar 28. Also, the indicator has a bottom row of lights which include a stop light 52 coupled to the position sensor 38 and an on/off light 53 that indicates if a push button switch 54 has been pressed to activate the indicator. Each light 46a, 46b has associated therewith a respective semicircular steering wheel turn arrow 55. When lights 46a or 46b are on, the arrows 55a, 55b indicate to the driver which direction to turn the steering wheel to align the truck ball coupler 16 with the trailer hitch 12 as the truck is backed toward the trailer. The center light 48 is typically of a different color than the lights 46a, 46b, preferably green, and indicates the truck 14 is aligned or "centered" with the trailer 10. Because of the spacing of sensors 32a, 32b and the width of the collimated alignment beam 19, the desired alignment exists only when the light 48 is on and the lights 46a, 46b are off, indicating the collimated beam is positioned between the two sensors 32a, 32b and that hitch 12 is centered on the ball coupler 16. The stop light 52 on the bottom row is preferably red and indicates when the hitch 12 is immediately over the ball coupler 16. When the center light 48 and stop light 52 are on, and lights 46a, 46b are off, the trailer 10 and truck 14 are ready to be coupled together. The indicator 44 also indicates if an object is between the trailer 10 and truck 14 in a position to block the collimated beam from reaching any of the sensors 32a, 32b or 36. In this case, all of the indicator lights 46a, 46b and 48 will be off and the driver is alerted to stop the truck and check for obstructions.

The operation of the invention is best understood with reference to FIGS. 1 and 2 and also with reference to the block diagram of FIG. 3. With the light unit 22 operational, a collimated beam having a predetermined horizontal width is projected toward truck 14 and centered in a vertical plane containing the longitudinal axis of the trailer and bisecting the hitch 12. With the truck 14 and trailer 10 properly aligned, as shown in FIG. 1, the collimated beam strikes the support bar 28 between outer alignment sensors 32a, 32b such that the sensors do not receive the light. However, the beam impinges on the central sensor 36. Consequently, the sensor 36 generates a signal which is coupled via circuitry described below to the indicator 44 and causes lighting of the center light 48. The indicator lights 46a, 46b remain off, indicating that the trailer and truck are aligned and that the driver need only back up in a straight line toward the trailer 10. When the truck 14 is positioned relative to the trailer 10 as shown in FIG. 2, the focused beam from position emitter 24 strikes the position sensor 38, indicating that the hitch 12 is over the ball coupler 16. The sensor 38 then generates a signal to indicator 44 and causes the stop light 52 to light. Also, an audio alarm, described below, is activated. The visual and audio indicators signal the driver to stop the truck 14.

If the truck 14 is approaching the trailer 10 from somewhat of an angle or is otherwise somewhat misaligned with the trailer, the collimated beam 19 strikes one or the other of the sensors 32a, 32b on the support bar 28. The sensor 32a or 32b that receives light generates a signal which causes the corresponding dash indicator light 46a, 46b to light up. The associated arrows 55a, 55b then indicate which way the driver should turn the steering wheel to align the truck and trailer. For example, if the collimated beam strikes the sensor 32a shown in FIG. 3, the truck 14 is laterally displaced to the left of the trailer 10 (looking from the trailer 10 toward the truck 14) and the light 46a is lit. Arrow 55a, associated with light 46a, then indicates the driver should turn the steering wheel clockwise as the truck is backed up. This action will turn the front wheels of the truck to the right and cause the rear of the truck to swing toward proper alignment with the trailer.

FIGS. 3 and 6 also show optional means for detecting the beam beyond the bar 28. Such means may comprise one or more removable extension bars 56. Thus, one or more such bars 56 may be added to the end of the main support bar 28 to extend the lateral range across which the collimated beam can be detected. Each member 56 includes an additional alignment sensor 58 and is coupled to the main bar 28 by a conventional plug 62 such as a modular jack. The respective sensor 58 are wired in parallel with the adjacent sensor 32a or 32b so that the corresponding light 46a or 46b is lit if either of the interconnected sensors is struck by the collimated beam. The spacing between these additional sensors and the adjoining sensor is typically slightly less than the width of the beam 19 so that the beam cannot miss these sensors 58 when it is slightly to the right of sensor 32a or to the left of sensor 32b.

Figure 4:
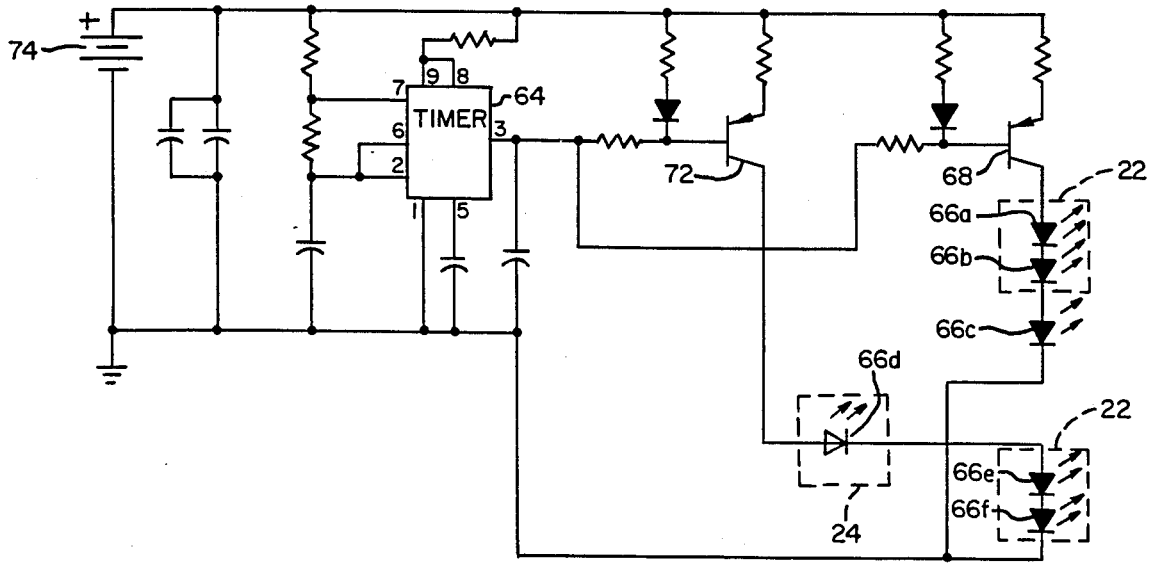
FIG. 4 is a schematic diagram of one form of optical beam emitter circuit used in the apparatus of FIG. 1.

FIG. 4 illustrates in greater detail the electrical circuit of the light unit 22 and position emitter 24. A timer 64 is configured as an oscillator to generate a square-wave output signal of approximately one kilohertz for pulsing infrared light emitting diodes (LEDs) 66a-66f on and off. Current for LEDs 66a-66c is provided by a PNP transistor 68 biased to a conducting state by the output signal of timer 64. PNP transistor 72 similarly provides current to LEDs 66d-66f. A battery 74 comprises the power supply for the circuit. The LEDs 66a-66b and 66e-66f are contained within the light unit 22 and are mounted behind the previously described collimating lens to produce the optical alignment beam with the previously described characteristics and shown in FIG. 1. Two sets of LEDs are provided so that the light unit 22 can still function at a shorter range if either transistor 68, 72 or several of the LEDs unexpectedly malfunction. LED 66d comprises the position emitter 24 and is contained in a separate housing as shown in FIGS. 1–3. LED 66c is positioned on the unit 22 housing and indicates whether light unit 22 and emitter 24 are operable.

Figure 5:
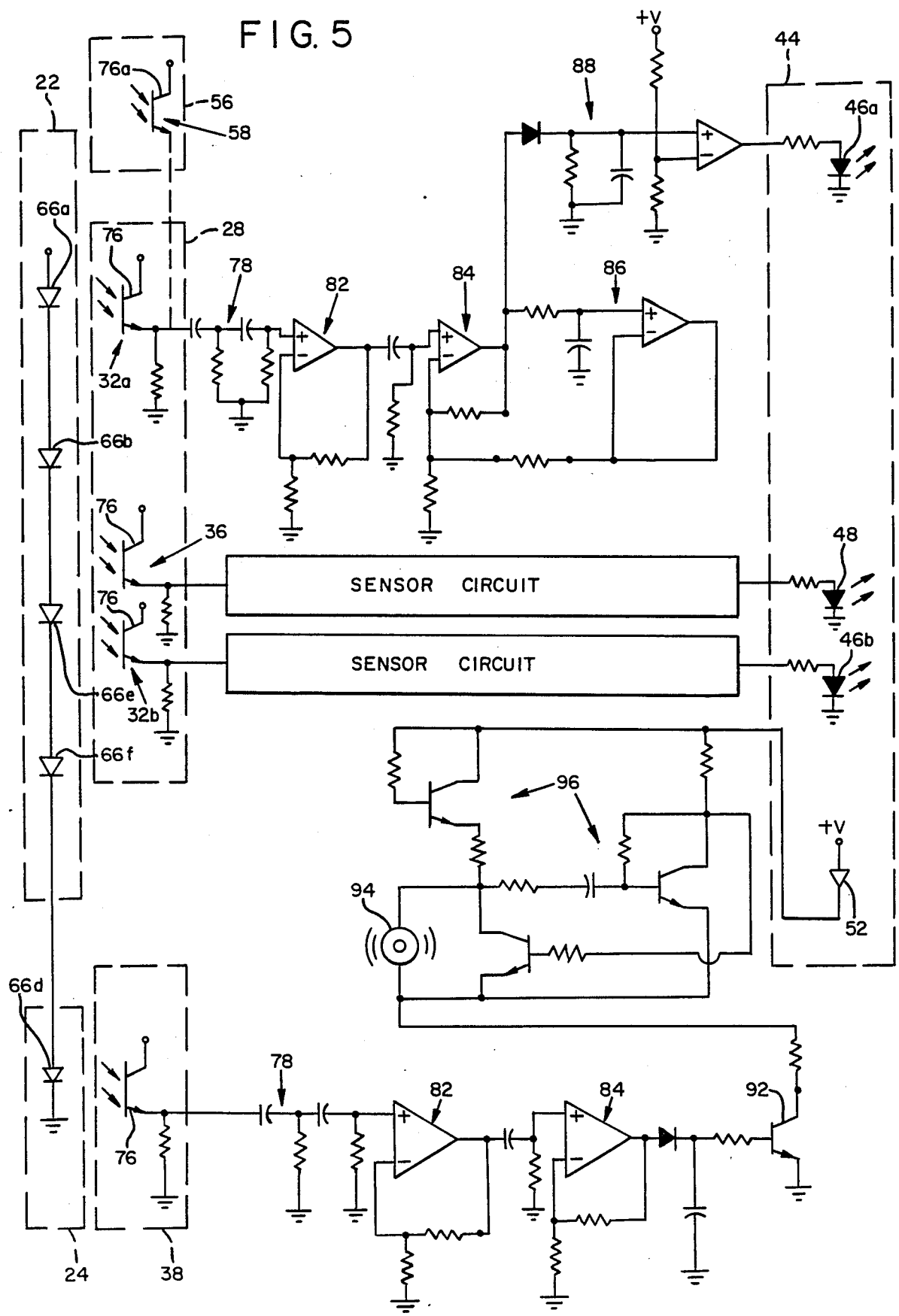
FIG. 5 is a schematic diagram of one form of optical beam detector and indicator circuit used in the apparatus of FIG. 1.

FIG. 5 illustrates the electric circuits of the alignment sensors 32a, 32b, 36 and position sensor 38. Except for the fact that the sensor circuits for sensors 32a, 32b may have additional sensors 58 coupled thereto, these circuits and the sensor circuit for sensor 36 are identical. Each comprises a phototransistor 76 tuned to receive infrared light from LEDs 66a-66b and 66e-66f. An additional phototransistor 76a is also shown in dashed lines coupled to the upper transistor 76 in FIG. 5 to illustrate the optional addition of the sensor 58 and extension bar 56 to the device. In response to light, transistor 76 produces an output signal that is passed through a high-pass filter 78 to filter out signals generated by ambient light and noise. The filtered output signal is then applied to a preamplifier 82 and an amplifier 84. The amplified output signal from amplifier 84 is filtered through a low-pass filter 86 and is routed to a differential amplifier or peak detector 88, where it is compared to a reference voltage. If the processed output signal is sufficient to exceed the reference voltage, peak detector 88 provides an output signal that drives the light 46a, which comprises an LED. The filtering provided by the FIG. 5 sensor circuit in combination with the use of a peak detector, substantially eliminates the effect of noise on the circuit. In other words, the circuit responds to optical signals, in this case infrared signals, of the frequency generated by transmitter unit 22. Therefore, the device is extremely accurate and sensitive at relatively large distances, such as in excess of a thirty foot spacing between the truck 14 and trailer 10.

The sensor circuit for position sensor 38 is very similar to the circuit just described. This circuit includes a phototransistor 76 for sensing light from LED 66d, a high-pass filter 78, a preamplifier 82, and an amplifier 84. The output of amplifier 84 drives an NPN transistor 92 that draws current through an audio alarm 94 and the light 52. Additional circuitry 96 is provided for decreasing the one kilohertz frequency so that the alarm 94 beeps and the light 52 flashes at a rate that is slow enough to be readily detectable by a driver of the vehicle. The peak detector and added filtering circuitry of the sensor circuits are eliminated from the position sensor circuit because this latter circuit does not need to be sensitive to long range signals. The combination of audio and visual indications that hitch 12 is over ball coupler 16 reduces the risk of a user backing the truck against the trailer tongue 11 and damaging either the truck or trailer.

The elements of the circuits in FIGS. 4 and 5 are conventional devices which are commercially available. Table 1 below sets forth an exemplary list of such elements:

TABLE 1

| Element | Designation |
| --- | --- |
| Timer 64 | LM555 |
| LEDs 66a–66f | LD274 |
| PNP transistors 68, 72 | 2N3906 |
| Phototransistors 76, 76a | BP103B-2 |
| Preamplifiers 82, amplifiers 84, low-pass filters 86 | LM324 |
| Peak detector 88 | LM324, IN4148 |
| NPN transistors 82 | 2N3904 |

It should be understood that the circuits herein illustrated as discrete could be produced in the form of an integrated circuit if so desired.

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. An apparatus for directing a towing vehicle having a towing coupling element toward a towing vehicle having a towed coupling element for hitching the coupling elements of said vehicles together, comprising:

emitting means mounted on the towed vehicle for transmitting a first focused optical beam toward the towing vehicle, the first beam having a predetermined width and for transmitting a second focused optical beam in a generally downward direction;

first receiver means mounted on the towing vehicle and comprising a plurality of optical sensors in predetermined relation to the towing coupling element for discretely detecting the presence of the first beam relative to the towing coupling element; and second receiver means mounted to the towing vehicle for detecting the second focused beam when the towed coupling element of the towed vehicle is in hitching relation to the towing coupling element; and indicator means coupled to the first receiver means for indicating the alignment of the towing coupling element with the towed coupling element as the towing vehicle is moved toward the towed vehicle and coupled to the second receiver means for indicating when said coupling elements are in hitching relation.

2. The apparatus of claim 1 in which the emitting means includes an infrared position emitter mounted adjacent to the towed coupling element and the second receiver means comprises an infrared position sensor mounted adjacent to the towing coupling element.

3. The apparatus of claim 1 in which the indicator means includes an indicator light corresponding to the second receiver means for indicating when the towing coupling element and towed coupling element are in hitching relation.

4. An apparatus for directing a towing vehicle having a towing coupling element to a towed vehicle having a towed coupling element for hitching the coupling elements of said vehicles together, the towing and towed vehicles each having a respective longitudinal axis comprising:

a first infrared light emitter mounted on the towed vehicle for transmitting a collimated infrared beam forwardly over the towed coupling element, the collimated beam having a predetermined horizontal width;

a second infrared light emitter mounted on the towed coupling element for transmitting a second focused beam downwardly beyond the front end of said towed coupling element;

an elongated support bar mounted to the rear of the towing vehicle in a position normal to the longitudinal axis of the towing vehicle, the support bar including at least three spaced apart infrared alignment sensors, the outer two sensors being spaced equidistantly from the center of the towing vehicle coupling element and being spaced apart a distance slightly greater than the width of the first beam, the third sensor being positioned between the two outer sensors for detecting the presence of the first beam centered therebetween;

an infrared position sensor mounted on the towing coupling element for detecting the second focused beam when the towing coupling element is in hitching relation to the towed coupling element; and an indicator mounted to the front of the towed vehicle and electrically coupled to sensors on the support bar and to the infrared position sensor, the indicator including a plurality of indicator lights responsive to the infrared alignment sensors for indicating towing vehicle movement which is necessary for aligning the towing coupling element with the towed coupling element, the indicator further including an indicator light and audio alarm responsive to the infrared position sensor for indicating when said coupling elements are in hitching relation.

* * * * *

UNITED STATES PATENT AND TRADEMARK OFFICE
CERTIFICATE OF CORRECTION

PATENT NO. : 4,852,901

DATED : August 1, 1989

INVENTOR(S) : Donald R. Beasley and Paul J. Hanson

It is certified that error appears in the above-identified patent and that said Letters Patent is hereby corrected as shown below:

In the Specification:

Column 2, line 3, "t" should be --to--.

In the Claims:

Column 7, line 34, "towing" should be --towed--.

Signed and Sealed this

Fourteenth Day of August, 1990

Attest:

HARRY F. MANBECK, JR.

Attesting Officer

Commissioner of Patents and Trademarks